(12) United States Patent
Mirza-Baig (10) Patent No.: US 7,805,134 B2
(45) Date of Patent: Sep. 28, 2010

(54) CONFIGURATION AND MANAGEMENT OF WIRELESS NETWORK DEVICES

(75) Inventor: Attaullah Mirza-Baig, Santa Clara, CA (US)

(73) Assignee: Ricoh Company, Ltd., Tokyo (JP)

( * ) Notice: Subject to any disclaimer, the term of this patent is extended or adjusted under 35 U.S.C. 154(b) by 715 days.

(21) Appl. No.: 11/732,763

(22) Filed: Apr. 3, 2007

(65) Prior Publication Data

US 2008/0248794 A1 Oct. 9, 2008

(51) Int. Cl.
H04M 3/00 (2006.01)

(52) U.S. Cl. ............... 455/418; 455/420; 455/436; 455/512; 455/552.1; 709/220

(58) Field of Classification Search ............ 370/230, 370/237, 328, 331, 338, 401; 455/412.1, 455/418, 423, 436, 437, 452.1, 456.1, 456.6, 455/450, 502
See application file for complete search history.

(56) References Cited

U.S. PATENT DOCUMENTS

| | | | |
|---|---|---|---|
| 7,058,719 B2 | 1/2004 | Motoyama | |
| 6,738,637 B1 * | 5/2004 | Marinho et al. | 455/512 |
| 2004/0127208 A1 * | 7/2004 | Nair et al. | 455/420 |
| 2005/0227720 A1 * | 10/2005 | Gunaratnam et al. | 455/510 |
| 2006/0084438 A1 * | 4/2006 | Kwon | 455/436 |
| 2006/0106918 A1 * | 5/2006 | Evert et al. | 709/220 |
| 2006/0221933 A1 * | 10/2006 | Bauer et al. | 370/352 |
| 2006/0246941 A1 * | 11/2006 | Watanabe et al. | 455/552.1 |

* cited by examiner

Primary Examiner—Danh C. Le
Assistant Examiner—Dinh P Nguyen
(74) Attorney, Agent, or Firm—Hickman Palermo Truong & Becker LLP; Edward A. Becker (57) ABSTRACT

An approach is provided wherein a lack of wireless connectivity between a wireless network device and a wireless network is detected, and the wireless network device connects to an administrator device over a separate wireless network. Network configuration data is transmitted from the administrator device to the wireless network device over the separate wireless network and based on the network configuration data the wireless network device attempts to reconnect to the wireless network.

29 Claims, 4 Drawing Sheets

CONFIGURATION AND MANAGEMENT OF WIRELESS NETWORK DEVICES

FIELD OF THE INVENTION

This invention relates generally to wireless network devices, and more specifically, to configuring and managing wireless network devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

A wireless network device includes any device enabled to utilize a wireless network connection. Examples are a wireless printer, a network router, or network switch. These devices have become increasingly popular as wireless networking technology has become standard. Another example of a wireless network device is an embedded device, which is a device other than a personal computer, which utilizes a wireless network connection, and which does not usually have or require continuous human interaction. The above examples may also be considered embedded devices.

Wireless network devices must be configured prior to use; for example, details of the wireless network must be provided. This currently requires an administrator to physically interact with the device for an extended period of time. Further, when the devices malfunction, such as the wireless network connectivity between the device and a wireless network becoming inactive, a person must physically go to the device to fix the problem. Also, because a human may not be physically present at the device, the malfunction may not be discovered immediately, thereby delaying the eventual repair of the problem.

A present approach to initially configuring wireless network devices and reconfiguring the devices in the event of malfunction consists of connecting to the device via a wired connection or utilizing a control panel affixed to the device. A drawback to the prior approaches is that the wireless network device must support both wired and wireless interfaces, which not only increases the cost of manufacture, but defeats the purpose of having a truly wireless device that can be configured and maintained remotely, thereby eliminating the need for an administrator to physically visit each device. Also, with control panels, some parameters are difficult to enter, such as security certificates, and the repetition of configuring numerous devices is tedious and prone to error.

Another approach involves the use of a wired connection and a web server executing on the device. While this approach eases the uploading of security parameters such as encryption codes and security certificates, it still suffers from the need for a wired interface and the need for a web server on the device.

The need for wired interfaces, web servers, and the repetitive nature of initial configuration and reconfiguration that requires lengthy physical presence at the device both increases the cost of wireless network devices and reduces productivity. It also reduces the benefit of a truly wireless solution in a truly wireless environment.

Consequently, there is a need in the art for a solution that allows for the wireless configuration and maintenance of wireless network devices that does not suffer from the aforementioned shortcomings of current approaches.

SUMMARY

An approach is provided wherein, in one embodiment, an administrator device is configured to communicate with a wireless network device, for example by entering an identification code. A wireless network device is powered up and the same identification code is entered, for example via a keypad. The wireless interface of the wireless network device then enters a "configuration mode" wherein the wireless network device communicates with a wireless interface of the administrator device, which in one embodiment is a dedicated wireless interface utilized for this purpose only and is separate from a standard wireless interface (such as a wireless card) of the administrator device. According to alternate embodiments, the standard wireless interface of the administrator device is configured to communicate with the wireless network device while the wireless network device is in configuration mode.

According to an embodiment, after the wireless network device communicates with the wireless interface of the administrator device, the administrator device uploads configuration files or instructions to the wireless network device that enable the wireless network device to connect to a wireless LAN or WAN; for example, a company network over which the wireless network device will communicate with client PCs ("the network"). After the configuration is complete, the wireless network device disconnects from the wireless interface of the administrator device, leaves configuration mode, and attempts to connect to the network as specified by the configuration files. If the connection is not completed within a specified time, the wireless network device reenters configuration mode and contacts the administrator device via the wireless interface of the administrator device, alerts the administrator of the connection failure, and awaits reconfiguration. The wireless network device then attempts to connect to the network again.

According to an embodiment, if at any point in the future, the wireless network device is disconnected from the network for greater than a specified time, the wireless network device enters configuration mode and connects to the administrator device via the initial wireless interface for reconfiguration, such as communicating additional configuration instructions, and to allow the administrator to troubleshoot the wireless network device's connection to the network.

According to an embodiment, an apparatus is provided wherein the apparatus is configured to detect a lack of wireless connectivity between a wireless network device and a first wireless network, and in response to detecting the lack of wireless connectivity between the wireless network device and the first wireless network, communicating with an administrator device over a second wireless network. Then, the apparatus is configured to receive configuration data from the administrator device over the second wireless network, and based on the configuration data, connect to the first wireless network. According to an embodiment, the apparatus may comprise a wireless interface configured to detect a lack of wireless connectivity between a wireless network device and a first wireless network and communicate with the administrator device over a second wireless network. The apparatus may further comprise a communications module configured to receive configuration data from the administrator device over the second wireless network and process the configuration data. Based on the configuration data, the wireless interface connects to the first wireless network.

This approach allows the wireless network device to communicate wirelessly with an administrator device in the event of initial configuration or connectivity problems with the network, thereby alleviating the need for a wired interface on the wireless network device and for an administrator to physically visit the wireless network device to configure the network connection or troubleshoot the network connection to the wireless network device.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. Overview
II. Architecture
III. Configuration and Management of Wireless Network Devices
IV. Operational Example
V. Implementation Mechanisms I. Overview An approach is provided wherein, in one embodiment, an administrator device is configured to communicate with a wireless network device, for example by entering an identification code or other parameters. A wireless network device is powered up and the same identification code is entered, for example via a keypad. The wireless interface of the wireless network device then enters a "configuration mode" wherein the wireless network device communicates with a wireless interface of the administrator device, which in one embodiment is a dedicated wireless interface utilized for this purpose only and is separate from a standard wireless interface (such as a wireless card) of the administrator device. According to alternate embodiments, the standard wireless interface of the administrator device is configured to communicate with the wireless network device while the wireless network device is in configuration mode.

According to an embodiment, after the wireless network device communicates with the wireless interface of the administrator device, the administrator device uploads configuration files or instructions to the wireless network device that enable the wireless network device to connect to a wireless LAN or WAN; for example, a company network over which the wireless network device will communicate with client PCs ("the network"). After the configuration is complete, the wireless network device disconnects from the wireless interface of the administrator device, leaves configuration mode, and attempts to connect to the network as specified by the configuration files. If the connection is not completed within a specified time, the wireless network device reenters configuration mode and contacts the administrator device via the wireless interface of the administrator device, alerts the administrator of the connection failure, and awaits reconfiguration. The wireless network device then attempts to connect to the network again.

According to an embodiment, if at any point in the future, the wireless network device is disconnected from the network for greater than a specified time, the wireless network device enters configuration mode and connects to the administrator device independently of the network via the initial wireless interface for reconfiguration, such as communicating additional configuration instructions and to allow the administrator to troubleshoot the wireless network device's connection to the network.

This approach allows the wireless network device to communicate wirelessly with an administrator device in the event of initial configuration or connectivity problems with the network, thereby alleviating the need for a wired interface on the wireless network device and for an administrator to physically visit the wireless network device to configure the network connection or troubleshoot the network connection to the wireless network device.

II. Architecture

Figure 1:
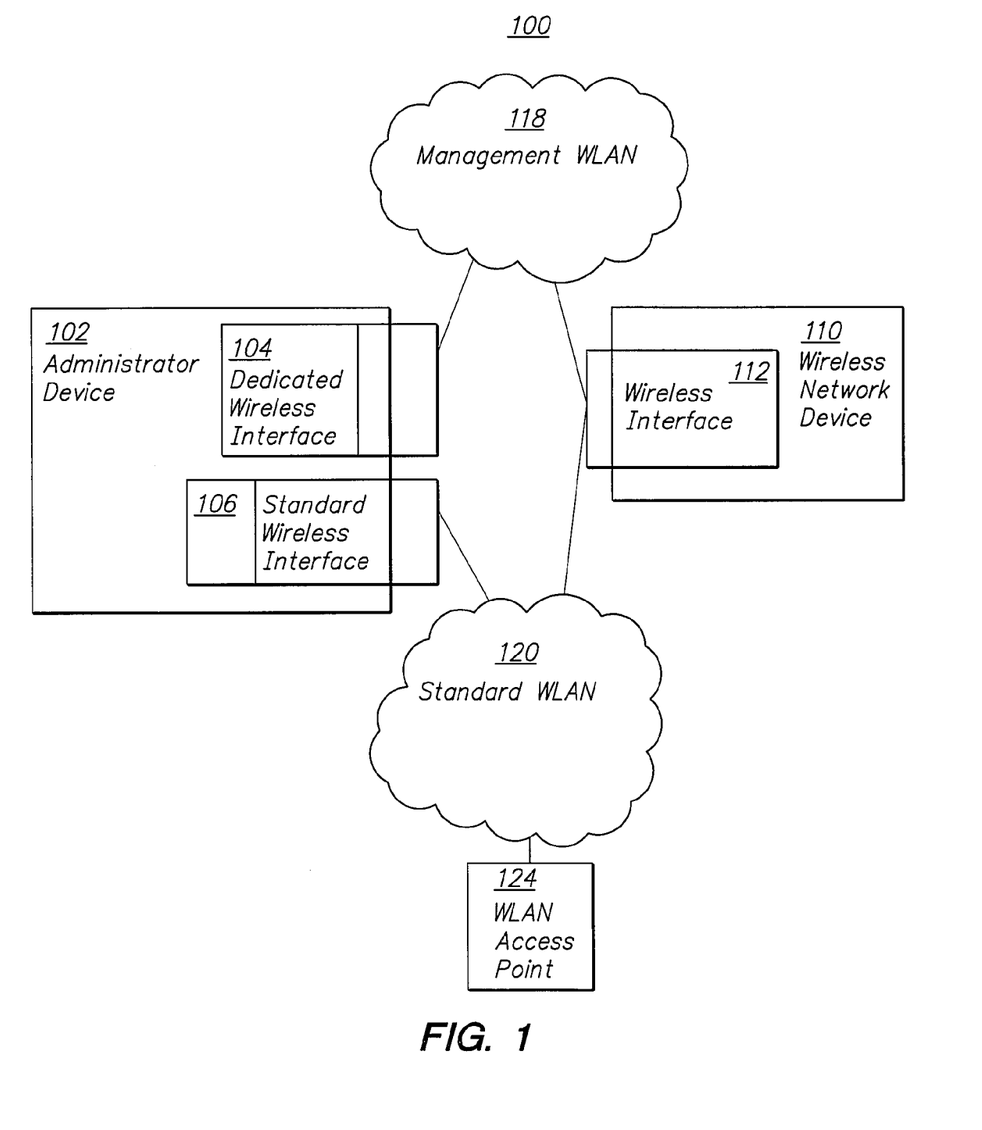
FIG. 1 is a block diagram that depicts an arrangement for configuration and management of wireless network devices according to one embodiment of the invention.

FIG. 1 is a block diagram that depicts an arrangement 100 for configuration and management of wireless network devices according to one embodiment of the invention. Arrangement 100 includes at least one administrator device 102 configured with a dedicated wireless interface 104 for managing wireless network devices and a standard wireless interface 106 for normal wireless connections. Examples of administrator device 102 include, without limitation, a personal computer, a personal digital assistant (PDA), or any type of mobile device. Although embodiments of the administrator device are depicted in the figures and described herein in the context of having a dedicated wireless interface 104 and a standard wireless interface 106, the functionality of these elements may be combined into a single element or implemented in any number of separate elements. Furthermore, the functionality of the dedicated wireless interface 104 and a standard wireless interface 106 may be implemented in hardware, software, or any combination of hardware and software, depending upon a particular implementation.

Arrangement 100 includes at least one wireless network device 110 configured with a wireless interface 112 for wireless communication over a standard wireless LAN or WAN 120 to which the administrator device 102 and other devices, such as a WLAN access point 124 may be connected. Wireless interface 112 of the wireless network device 110 may also be used for wireless communications over a management wireless LAN 118 that in one embodiment is used solely to communicate with one or more administrator devices 102 wirelessly.

Figure 2:
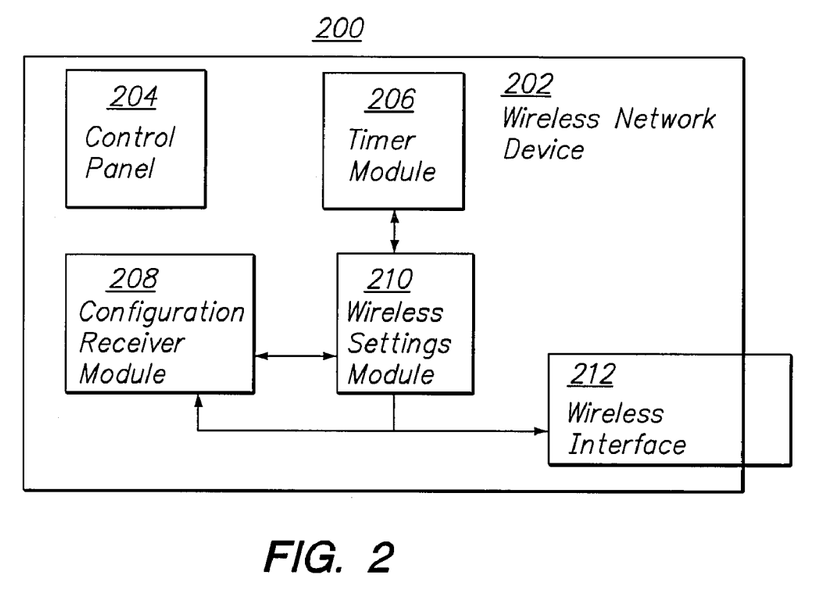
FIG. 2 is a block diagram that depicts an example of an wireless network device according to an embodiment of the invention.

FIG. 2 is a block diagram 200 that depicts an example of a wireless network device 202 according to an embodiment of the invention. In the example illustrated in FIG. 2, the wireless network device 202 is a printing device or multi-function printing device. The wireless network device 202 has a control panel 204 accessible to users. According to an embodiment, the control panel 204 may be a LCD screen capable of displaying ASCII characters, along with one or more input devices such as buttons through which input may be received and displayed on the LCD screen. For example, one embodiment of the control panel 204 comprises a LCD screen and 2 buttons, through which an alphanumeric code may be entered and displayed. In other embodiments, the control panel 204 may be of varying complexity and utility.

Timer module 206 is capable of measuring a specified duration of time and communicating the expiration of the duration to the wireless settings module 210. According to an embodiment, the wireless settings module 210 establishes and/or receives parameters for the wireless connection, monitors the connection status, and changes settings of the wireless interface 212, for example to cause a connection to the management wireless LAN 120. Configuration receiver module 208 receives and processes configuration files, for example communicated from the administrator device 102 over the management wireless LAN 120. According to an embodiment, the configuration receiver module 208, wireless settings module 210, timer module 206, and wireless interface 212 are communicatively coupled.

Although embodiments of the wireless network device are depicted in the figures and described herein in the context of having a configuration receiver module 208, wireless settings module 210, timer module 206, and wireless interface 212, the functionality of these elements may be combined into a single element or implemented in any number of separate elements. Furthermore, the functionality of the configuration receiver module 208, wireless settings module 210, timer module 206, and wireless interface 212 may be implemented in hardware, software, or any combination of hardware and software, depending upon a particular implementation. For example, the configuration receiver module 208 may be a software program accessed by the wireless network device 202 and executed on one or more processor cores associated with the wireless network device 202. In another example, the configuration receiver module 208 or other module may comprise an integrated circuit or other hardware.

Figure 3:
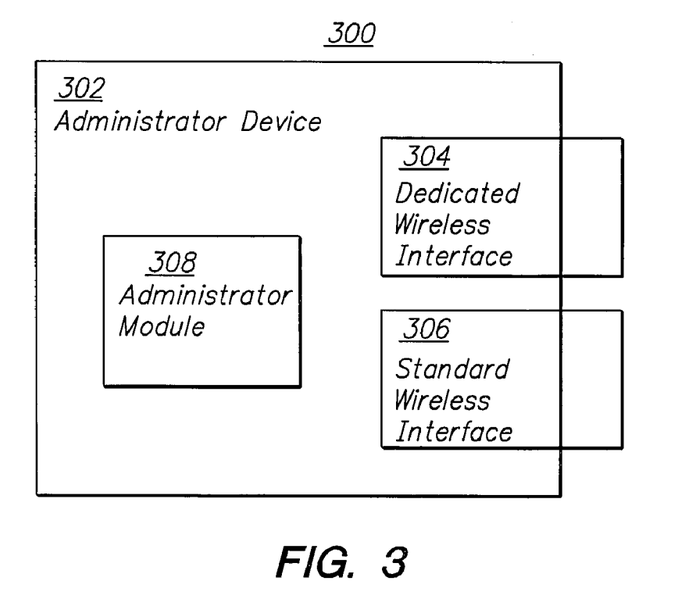
FIG. 3 is a block diagram that depicts an example of an administrator device according to an embodiment of the invention.

FIG. 3 is a block diagram 300 that depicts an example of an administrator device 302 according to an embodiment of the invention. For example, administrator device 302 could be a laptop computer. According to an embodiment, administrator device 302 is capable of executing an administrator module 308, which in one embodiment comprises executable instructions capable of being executed by a processor. For example, the administrator module 308 may be a software program accessed by the administrator device 302 and executed on one or more processor cores associated with the administrator device 302. In another embodiment, administrator module 308 may comprise an integrated circuit or other hardware.

According to an embodiment, administrator module 308 is capable of causing numerous instructions to be executed, such as instructions for storing and communicating wireless network configuration files to one or more wireless network devices, causing a notification of a wireless malfunction to be displayed on the administrator device, and configuring a wireless interface. Administrator device 302 may be configured with a dedicated wireless interface 304 used solely for managing wireless network devices, for example over a management wireless LAN 118, and a standard wireless interface 306 for normal wireless connections, for example over a standard wireless LAN 120. According to an embodiment, the dedicated wireless interface 304 and standard wireless interface 306 may be combined into one device, for example a standard wireless interface card.

III. Configuration and Management of Wireless Network Devices

According to an embodiment, a wireless network device is configured with a single wireless interface and a default configuration that includes a default service set identifier (SSID), which is an identifier attached to the header of packets sent over a WLAN that acts as a password when a mobile device tries to connect to an access point. The SSID differentiates one WLAN from another, so all access points and all devices attempting to connect to a specific WLAN must use the same SSID. The default configuration also specifies a level of security, in one embodiment being RSN-PSK security enabled with AES encryption.

An administrator device is configured with an administrator module, which in alternate embodiments may be implemented in software or hardware or a combination of both. The administrator module listens on a wireless interface configured with the same SSID as provided in a default configuration or provided manually for the embedded device. According to an embodiment, the administrator module listens on a dedicated wireless interface of the administrator device. The wireless interface of the administrator device operates like a wireless access point for all wireless network devices.

According to an embodiment, wireless network security parameters, such as an encryption code or a SSID identifier, is entered at each wireless network device during initial configuration. This code may also be entered at the administrator device, for example, it may be stored and accessed by the administrator module. In one embodiment, the security parameters, such as an identification code, may be alphanumeric and used to generate a key used for the purpose of initial configuration of a wireless network device. The key may be generated from an identification code using the WPA/RSN specification or other encryption techniques. Upon the wireless network security parameters being entered at the wireless network device, the wireless interface of the wireless network device attempts to connect wirelessly to the administrator device, either through a dedicated wireless interface or a standard wireless interface. The wireless communication between the wireless network device and administrator device may be assumed secure because of the use of the wireless network security parameters and/or generated key, although alternate embodiments are envisioned where encryption and/or other security measures are utilized. According to an embodiment, the key is identical for all wireless network devices selected to be monitored and maintained by an administrator device; this allows for all wireless network devices to connect to an administrator device independently of the standard wireless LAN 120, and allows for any administrator device configured with the wireless network security parameters to connect to the wireless network devices that share the wireless network security parameters.

Once the administrator device and the wireless network device are wirelessly connected and the connection is verified through the use of the wireless network security parameters, configuration data, which may be contained in one or more files, may be transferred from the administrator device to the wireless network device. According to an embodiment, the configuration data is transferred via FTP or HTTP; for example, an FTP process on the administrator device may connect to a FTP process on the wireless network device and transfer configuration data. Any connection protocol used to transfer data may be used. The configuration data provides configuration parameters such as network SSID, user IDs, passwords, security certificates, and encryption parameters. According to an embodiment, the configuration data may be separated into device specific and network specific files. A file containing device specific configuration parameters may include details such as a user ID and password for the specific wireless network device, while a file containing network specific configuration parameters may include details such as SSID, encryption type, and authentication type for the wireless network.

According to an embodiment, the configuration receiver module 208 of the wireless network device processes the configuration data received from the administrator device and the wireless settings module 210 uses the configuration data to set the parameters for the wireless connection between the wireless network device and the standard wireless LAN or WAN 120. After the configuration data has been transferred to the wireless network device, the administrator device disconnects from the wireless network device. Using the parameters for the wireless connection as specified by the configuration data, for example a network SSID and password, the wireless network device attempts to connect to the standard wireless LAN or WAN 120.

The timer module 206 on the wireless network device begins to count down from a specified time, for example two minutes, and alerts the wireless settings module 210 upon expiration of the specified time. If the wireless network device fails to connect to the standard wireless LAN or WAN 120 within the specified time, the wireless network device reconnects to the administrator device over the management wireless LAN 118 and communicates data sufficient to cause the administrator module 308 on the administrator device to alert a user of the administrator device that the particular wireless network device cannot connect to the standard wireless LAN or WAN 120. In one embodiment, a pop-up dialog box is displayed with information regarding the wireless network device and details regarding the connection problem, for example, whether this is an initial connection problem or a post-initial connection problem. In response to the communication from the wireless network device regarding the connection problem, the administrator module 308 may cause instructions to be executed on the administrator device that lead a user through the steps necessary to troubleshoot the wireless network device's connection problem. For example, a "wizard" may be activated that allows an administrator a user-friendly way to reconfigure the embedded device.

According to an embodiment, whenever the wireless network device loses connection to the standard wireless LAN or WAN 120, the timer module 206 counts down a specified amount of time. If the connection is not restored prior to the expiration of the specified amount of time, the wireless network device reconnects to the administrator device over the management wireless LAN 118 and communicates data sufficient to cause the administrator module 308 on the administrator device to alert a user of the administrator device that the particular wireless network device cannot connect to the standard wireless LAN or WAN 120.

IV. Operational Example

Figure 4:
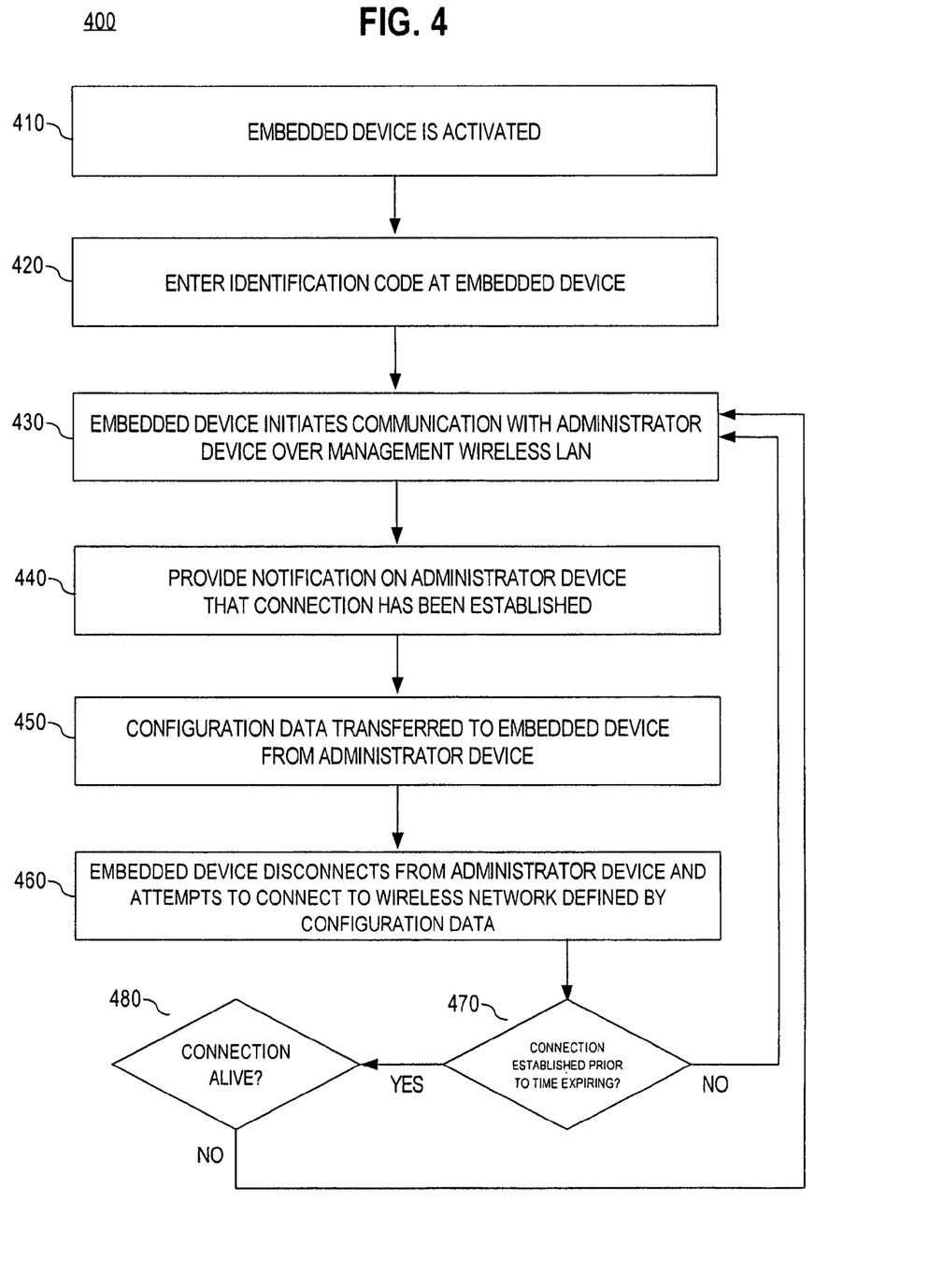
FIG. 4 is a flow diagram illustrating an approach for initial configuration and subsequent management of wireless network devices according to an embodiment of the invention.

FIG. 4 is a flow diagram 400 illustrating an approach for initial configuration and subsequent management of wireless network devices according to an embodiment of the invention. In step 410, an wireless network device is powered up. According to an embodiment, this is the initial activation of the wireless network device. In an embodiment, the wireless network device has been configured with default network parameters prior to use; for example, the wireless network device may be assigned a default IP address, a default wireless service area, a default SSID, a default infrastructure wireless mode, and/or default encryption parameters such as RSN-PSK being enabled with AES encryption by default.

In step 420, wireless network security parameters are entered at the wireless network device, for example via a keypad and LCD display or other controls and display. In one embodiment, an identification code is used in generating a key that is used for the purpose of initial configuration of a wireless network device. The key may be generated from the identification code using the WPA/RSN specification or other encryption techniques. In an embodiment, because the generated key used by specified wireless network devices is identical to the key used by specified administrator devices, the devices are able to handshake and establish a connection. The use of the identification code and/or key provides security for the wireless communications between wireless network devices and administrator devices that share the same identification code and/or key.

In step 430, the wireless network device initiates communication with an administrator device using a management wireless LAN. According to an embodiment, the communication is secured using standard encryption techniques such as WPA based on the wireless network security parameters and/or key shared by the embedded device and any number of administrator devices. In an embodiment, the management wireless LAN is a wireless communication network that is separate from any other wireless LAN or WAN in use, and is used solely for the purpose of configuring and monitoring wireless network devices.

According to an embodiment, the wireless network device establishes a wireless communications link between its wireless interface and a wireless interface of the administrator device. The wireless interface of the administrator device may be a dedicated wireless interface that is used solely for the purpose of configuring and monitoring wireless network devices over the management wireless LAN and is separate from a wireless interface used to connect to standard wireless networks. In one embodiment, the wireless network device is able to connect to the administrator device because of the default network parameters associated with the embedded device, such as a default network SSID, and the identification code and/or key shared by the wireless network device and any number of administrator devices.

Once a connection is established between the wireless network device and the administrator device, in step 440 a notification is provided on the administrator device that the connection has been established. In one embodiment, this notification is generated by administrator module 308. The notification may be a pop-up GUI element on a screen of the administrator device; for example, the desktop of a laptop running Windows. In an embodiment, the administrator module 308 communicates with an operating system executing on the administrator device to provide the notification. The notification alerts a user that a wireless network device is either ready to accept initial configuration instructions (configuration) or has lost connection to the standard wireless LAN or WAN and the connection must be fixed (reconfiguration).

According to an embodiment, in either case, configuration data specifying parameters of the wireless connection between the wireless network device and the standard wireless LAN or WAN is transmitted from the administrator module 308 of the administrator device to the wireless settings module 210 of the wireless network device in step 450. The configuration data is then communicated to the configuration receiver module 208 and used by the wireless network device to configure the wireless connection. Parameters specified by the configuration data may include a SSID identification, encryption type and parameters, login information such as a user ID and password, and/or security certificates, among other parameters. Any type of information related to network parameters may be transmitted from the administrator device to the wireless network device over the management wireless LAN. The configuration data may be in ASCII format, XML, HTML, or any type of human- or computer-readable format. The configuration data may be split into one or more files and transmitted by various transmission protocols such as FTP and HTTP.

According to an embodiment, changes to the wireless network configuration of the wireless network device may be made from the administrator device in real time via a command-line interface (CLI) or graphical user interface (GUI) while the administrator device is connected to the wireless network device via the management wireless LAN.

In step 460, once the configuration data is transmitted from the administrator device to the wireless network device, the wireless network device disconnects from the administrator device and attempts to connect to the wireless network specified by the configuration data. In an embodiment, the administrator device disconnects from the wireless network device, either automatically after transmitting configuration data or in response to user input.

In step 470, a determination is made whether the specified time as counted down by the timer module on the wireless network device has expired without the wireless network device connecting to the standard wireless network, If the specified time expires without a connection being made, control passes to step 430 where the wireless network device reconnects to the administrator device over the management wireless LAN for reconfiguration. If the connection is established to the standard wireless LAN prior to the time expiring, then control passes to step 480, where it is determined if the connection is still alive. The determination in step 480 is continuous and performed as long as the connection is alive. In the event of the connection failing, the wireless network device detects the loss of connectivity and in response, control passes to step 430 where the wireless network device reconnects to the administrator device over the management wireless LAN for reconfiguration.

V. Implementation Mechanisms

Figure 5:
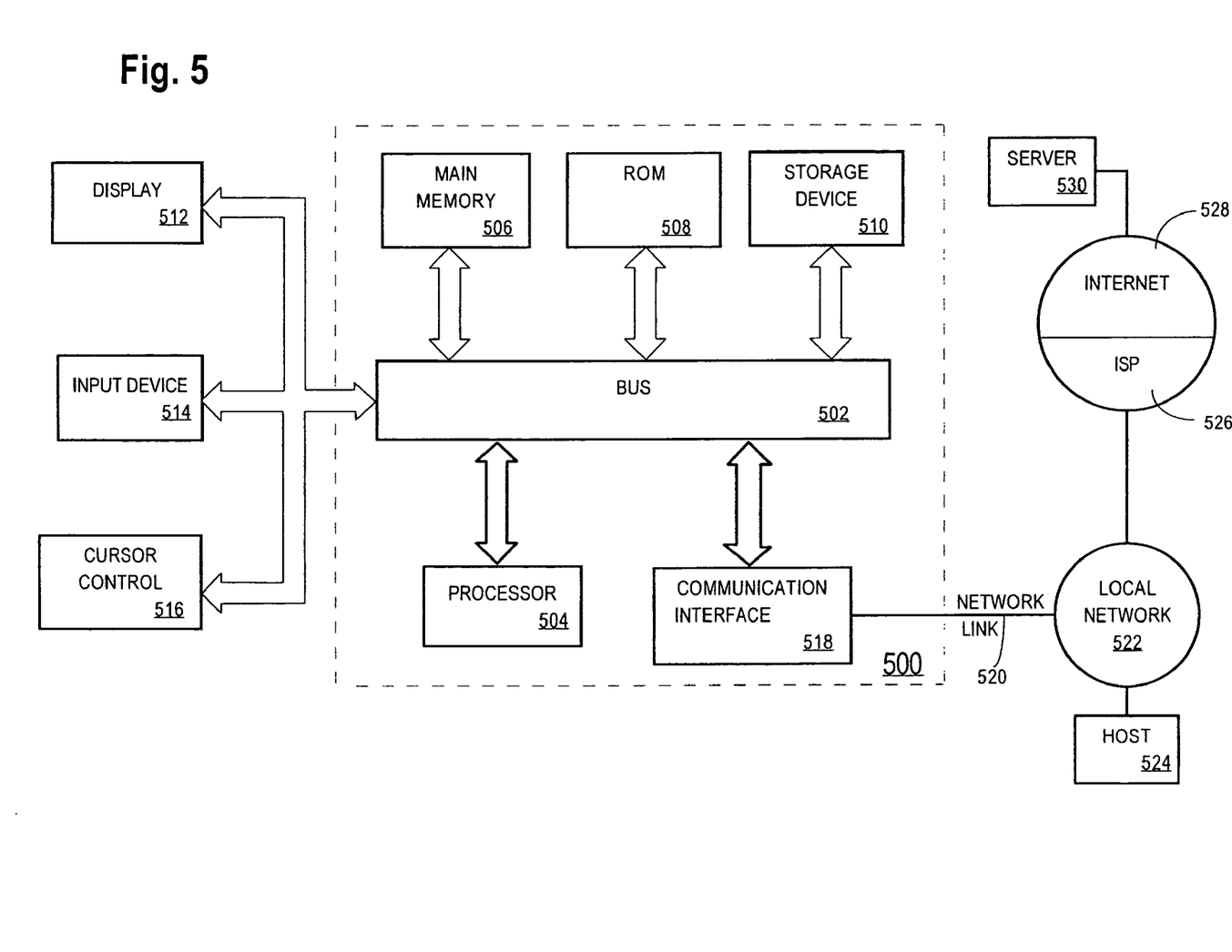
FIG. 5 is a block diagram of a computer system on which embodiments of the invention may be implemented.

The approach described herein and the various elements may be implemented in hardware, computer software or any combination of hardware and computer software on any type of computing platform. FIG. 5 is a block diagram that illustrates an example computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Embodiments of the invention are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 550 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for configuration and management of wireless network devices, the computer-implemented method comprising:
   a wireless network device detecting a lack of wireless connectivity between the wireless network device and a first wireless network;
   in response to detecting a lack of wireless connectivity between the wireless network device and the first wireless network, the wireless network device communicating with an administrator device over a second wireless network;
   the wireless network device receiving configuration data from the administrator device over the second wireless network;
   based on the configuration data, the wireless network device connecting to the first wireless network; and
   in response to the wireless network device not being able to connect to the first wireless network within a specified time, the wireless network device again communicating with the administrator device over the second wireless network.

2. The computer-implemented method of claim 1, wherein the administrator device further comprises a first and second wireless network interface, wherein the administrator device is configured to communicate with the first wireless network using only the first wireless network interface and communicate with the second wireless network using only the second wireless network interface.

3. The computer-implemented method of claim 1, wherein the administrator device comprises a wireless network interface configured to communicate with the first and second wireless network.

4. The computer-implemented method of claim 1, wherein the configuration data specifies parameters of the first wireless network.

5. The computer-implemented method of claim 4, wherein the parameters comprise a network SSID and security data.

6. The computer-implemented method of claim 1, wherein the step of based on the configuration data, the wireless network device connecting to the first wireless network further comprises:
   the wireless network device attempting to establish a connection with the first wireless network within a specified amount of time;
   if the wireless network device is unable to establish a connection with the first wireless network within the specified amount of time, then the wireless network device connecting to the administrator device over the second wireless network.

7. The computer-implemented method of claim 1, further comprising in response to the wireless network device detecting a lack of wireless connectivity between the device and a first wireless network, causing an alert to be activated on the administrator device.

8. The computer-implemented method of claim 7, wherein the alert comprises a visual display.

9. The computer-implemented method of claim 7, wherein the alert comprises an audio alert.

10. The computer-implemented method of claim 1, wherein the wireless network device is initially configured with a default configuration specifying one or more wireless network security parameters.

11. The computer-implemented method of claim 1, wherein an identification code is associated with the wireless network device and the administrator device prior to the wireless network device communicating with the administrator device.

12. The computer-implemented method of claim 1, wherein the wireless network device comprises a printing device.

13. An apparatus for configuration and management of wireless network devices, configured to:
   detect a lack of wireless connectivity between a wireless network device and a first wireless network;
   in response to detecting a lack of wireless connectivity between the wireless network device and the first wireless network, communicate with an administrator device over a second wireless network;
   receive configuration data from the administrator device over the second wireless network;
   based on the configuration data, connect to the first wireless network; and
   in response to the wireless network device not being able to connect to the first wireless network within a specified time, the wireless network device again communicating with the administrator device over the second wireless network.

14. The apparatus of claim 13, further comprising:
a first wireless network interface that is coupled to the administrator device and used solely for communicating with the first wireless network;
a second wireless network interface that is coupled to the administrator device and used solely for communicating with the second wireless network.

15. A computer-implemented method for configuration and management of wireless network devices, the computer-implemented method comprising:
specifying identification data for a wireless connection between a wireless network device and an administrator device;
based on the identification data, establishing a wireless connection between the wireless network device and the administrator device over a first wireless network;
transferring configuration data from the administrator device to the wireless network device over the first wireless network;
based on the configuration data, attempting to establish a wireless connection between the wireless network device and a second wireless network;
waiting a specified amount of time during which the wireless network device attempts to establish a wireless connection to the second wireless network; and
if the wireless network device is unable to communicate with the second wireless network within the specified amount of time, then causing the wireless network device to connect to the administrator device over the first wireless network.

16. The computer-implemented method of claim 15, wherein the identification data comprises wireless network security parameters.

17. The computer-implemented method of claim 15, wherein the identification data comprises an alphanumeric code that is entered at the wireless network device and further comprising the step of: based on the alphanumeric code, generating a security key.

18. The computer-implemented method of claim 15, wherein the configuration data comprises parameters defining the second wireless network.

19. The computer-implemented method of claim 15, wherein the administrator device comprises a first and second wireless network interface, and wherein the administrator device is configured to communicate with the first wireless network using only the first wireless network interface and communicate with the second wireless network using only the second wireless network interface.

20. The computer-implemented method of claim 15, further comprising:
in response to establishing the wireless connection between the wireless network device and the administrator device over the first wireless network, causing an alert to be generated at the administrator device.

21. The computer-implemented method of claim 15, wherein the configuration data comprises a network identifier and security parameters of the second wireless network.

22. The computer-implemented method of claim 15, wherein the configuration data comprises:
first data comprising parameters unique to the particular wireless network device; and
second data comprising configuration parameters for one or more wireless networks.

23. The computer-implemented method of claim 15, further comprising the steps of:
the wireless network device detecting a lack of wireless connectivity between the wireless network device and the second wireless network;
in response to detecting a lack of wireless connectivity between the wireless network device and the second wireless network, the wireless network device communicating with the administrator device over the first wireless network;
the wireless network device receiving configuration data from the administrator device over the first wireless network;
based on the configuration data, the wireless network device connecting to the second wireless network;
the wireless network device attempting to establish a connection with the second wireless network within a specified amount of time;
if the wireless network device is unable to establish a connection with the second wireless network within the specified amount of time, then the wireless network device connecting to the administrator device over the first wireless network.

24. A computer-implemented method for configuration and management of wireless network devices, the computer-implemented method comprising:
receiving through an operating panel of a wireless network device one or more wireless network security parameters;
establishing a connection between the wireless network device and a secure management wireless network using the wireless network security parameters;
receiving, over the secure management wireless network, configuration data that specifies parameters of a second wireless network;
establishing a connection between the wireless network device and the second wireless network using the configuration data; and
in response to the wireless network device not being able to connect to the second wireless network within a specified time, the wireless network device reconnecting to the secure management wireless network.

25. The computer-implemented method of claim 24, wherein the secure management wireless network is separate from the second wireless network.

26. The computer-implemented method of claim 24, wherein the wireless network security parameters comprise encryption data.

27. The computer-implemented method of claim 24, wherein the wireless network security parameters comprise a SSID.

28. The computer-implemented method of claim 24, wherein the wireless network device comprises a printing device.

29. The computer-implemented method of claim 24, wherein the steps are performed during an initial powering up of the wireless network device.

* * * * *